US012106616B2

(12) United States Patent
Li

(10) Patent No.: US 12,106,616 B2
(45) Date of Patent: Oct. 1, 2024

(54) HOT STANDBY FAULT PROCESSING SYSTEM, METHOD FOR VEHICLE AND VEHICLE FOR ADOPTING SAME

(71) Applicant: Black Sesame Technologies Inc., San Jose, CA (US)

(72) Inventor: Lin Li, Sichuan (CN)

(73) Assignee: Black Sesame Technologies Inc., San Jose, CA (US)

( * ) Notice: Subject to any disclaimer, the term of this patent is extended or adjusted under 35 U.S.C. 154(b) by 290 days.

(21) Appl. No.: 17/686,182

(22) Filed: Mar. 3, 2022

(65) Prior Publication Data

US 2022/0301367 A1 Sep. 22, 2022

(30) Foreign Application Priority Data

Mar. 17, 2021 (CN) ........................ 202110286237.0

(51) Int. Cl.
*G07C 5/08* (2006.01)
*G07C 5/00* (2006.01)

(52) U.S. Cl.
CPC ........... *G07C 5/0816* (2013.01); *G07C 5/008* (2013.01); *G07C 5/0841* (2013.01)

(58) Field of Classification Search
CPC .... G07C 5/0816; G07C 5/008; G07C 5/0841; G07C 5/0808; B60W 50/0205; B60W 50/029; B60W 2050/021; B60W 2050/0292; B60W 50/04–045; B60W 2050/041–043; B60W 2050/046–048; G06F 11/0739; G06F 11/0778; G06F 11/0784; G06F 11/0796; G06F 11/2028; G06F 11/2038; G06F 11/2043
See application file for complete search history.

(56) References Cited

U.S. PATENT DOCUMENTS

2021/0141697 A1* 5/2021 Chin .................. G06F 11/1076

FOREIGN PATENT DOCUMENTS

CN 101043310 A 9/2010
CN 104943562 A 1/2017
CN 106274531 A 1/2017
CN 104512422 B * 6/2017 ........ B60W 50/0205
(Continued)

*Primary Examiner* — Navid Z. Mehdizadeh
*Assistant Examiner* — Shelley Marie Osterhout
(74) *Attorney, Agent, or Firm* — Timothy T. Wang; Ni, Wang & Massand, PLLC

(57) ABSTRACT

A hot standby fault processing system is provided. The system includes a first detection layer configured to detect and record faults of vehicle configurations with low safety levels, a second detection layer configured to detect a fault of a vehicle configuration with critical safety level and send fault information, a fault collection layer configured to classify and record the received fault information, freeze the vehicle configuration corresponding to the fault information, and send the fault information to a higher processing layer, a first processing layer configured to receive fault information sent by the fault collection layer, process faults corresponding to the fault information according to a preset policy, and send fault information of faults that cannot be processed to system safety components, a redundancy part configured as a backup with the first processing layer and take over the operation of the first processing layer when the first processing layer fails.

12 Claims, 3 Drawing Sheets

(56) References Cited

FOREIGN PATENT DOCUMENTS

| | | | | | |
|---|---|---|---|---|---|
| CN | 207266447 | U | | 4/2018 | |
| CN | 110254439 | A | | 9/2019 | |
| CN | 107380170 | B | * | 12/2019 | ............ B60W 10/06 |
| JP | 2005219717 | A | | 8/2005 | |

* cited by examiner

HOT STANDBY FAULT PROCESSING SYSTEM, METHOD FOR VEHICLE AND VEHICLE FOR ADOPTING SAME

CROSS-REFERENCE TO RELATED APPLICATIONS

The disclosure claims priority to Chinese patent disclosure No. 202110286237.0, filed on Mar. 17, 2021, the entire contents of which are incorporated herein by reference.

TECHNICAL FIELD

The present disclosure relates to the technical field of vehicle fault processing technologies, and more specifically, to a hot standby fault processing technology for vehicles.

BACKGROUND

When an automobile breaks down, the fault system needs to collect system information, collect fault problems, and make quick decisions to ensure the safety and stability of the whole vehicle system.

A fault diagnosis and management method for a hybrid vehicle is disclosed in a Chinese Patent with an Application No. 201510680937.2. According to the method, state information and fault information of the entire hybrid vehicle and each component system of the hybrid vehicle are obtained by a vehicle control unit of the hybrid vehicle. The vehicle control unit assigns the fault identification and fault level to all the faults in the fault list. The vehicle control unit analyzes and judges the faults of the whole vehicle. When a fault occurs, the vehicle control unit manages the whole hybrid vehicle according to the fault level and the complete fault code. Obviously, this method relies heavily on the vehicle control unit. In this case, once the vehicle control unit is abnormal, the failure system of the vehicle will be paralyzed, which will affect the driving safety.

A dual-chip redundancy and fault-tolerant control system for automobile steering by wire is disclosed in a Chinese patent having the application No. of 201610389410.9. Based on the hot standby method, one chip in the dual-core is responsible for data receiving and processing, and the other is responsible for data receiving and sending. In addition, once one of the chips reports an error, the other chip takes over the control right immediately, which makes the system quickly return to normal operating state, and greatly improves the stability and reliability of the system. However, this scheme needs to support the normal operation of the two chips at the same time. On the one hand, when there are differences between the overlapping functional parts of the two chips, it is impossible to decide which result to adopt. On the other hand, in order to complete the hot standby switch between the two chips, it is necessary to synchronize data at any time, which increases the computation and load.

SUMMARY

In view of this, the present disclosure provides an improved hot standby fault processing system for vehicles. According to one aspect of the application, the hot standby fault processing system for vehicles includes a first detection layer configured to detect a running state of a system with low security level and record fault information when a fault is detected; a second detection layer configured to detect the running state of a system with critical safety level and send the fault information when the fault is detected; a fault collection layer configured to receive the fault information sent by the second detection layer, classify and record the received fault information, freeze the running state of the system corresponding to the fault information, and send the fault information to a higher processing layer; a first processing layer configured to receive fault information sent by the fault collection layer, process faults corresponding to the fault information according to a preset policy, and send fault information of faults that cannot be processed to system safety components; a redundancy part configured as a backup with the first processing layer and take over the operation of the first processing layer when there is a failure of the first processing layer. The system safety components are configured to process a fault corresponding to the received fault information based on the information of the vehicle hot standby fault processing system.

In some of the examples, the first processing layer is provided in a first core of a processor, and the redundancy part is provided in a second core of the same processor.

In some of the examples, the first processing layer and the redundancy pan are configured to be operated based on a symmetric multiprocessing.

In some of the examples, the system safety component is a separate processor.

In some of the examples, the running state of the system with low safety level is a vehicle system having no effects on the operation and safety of the vehicle; and the running state of the system with critical safety level is the vehicle system of the vehicle which affects the operation and/or safety of the vehicle.

In another aspect of the disclosure, a fault processing method of hot standby for vehicles is provided. The method includes the steps of detecting, by a first detection layer, a running state of a system with low security level and record fault information when a fault is detected; detecting, by a second detection layer, the running state of a system with critical safety level and send the fault information when the fault is detected; receiving, by a fault collection layer, the fault information sent by the second detection layer, classifying and recording the received fault information, freezing the running state of the system corresponding to the fault information, and sending the fault information to a higher processing layer; receiving, by a first processing layer, the fault information sent by the fault collection layer, processing faults corresponding to the fault information according to a preset policy, and sending fault information of faults that cannot be processed to system safety components; configuring a redundancy part as a backup with the first processing layer and taking over the operation of the first processing layer when there is a failure of the first processing layer. The system safety components are configured to process a fault corresponding to the received fault information based on the information of the vehicle hot standby fault processing system.

A fault processing method of hot standby for vehicles is also provided in the disclosure. The method includes diving the hot standby fault processing system arranged in different systems of the vehicle into a first detection layer and a second detection layer; the first detection layer is configured to detect a running state of a system with low security level and record fault information when a fault is detected; the second detection layer is configured to detect the running state of a system with critical safety level and send the fault information when the fault is detected; providing a fault collection layer in each of the different systems; the fault collection layer is configured for receiving the fault information sent by the second detection layer, classifying and recording the received fault information, freezing the running state of the system corresponding to the fault information, and sending the fault information to a higher processing layer; providing a first processing layer, a redundancy part mutually backed up with the first processing layer and a system safety component in each of the different systems; the first processing layer is configured to receive fault information sent by the fault collection layer, process faults corresponding to the fault information according to a preset policy, and send fault information of faults that cannot be processed to system safety components; the redundancy part is configured as a backup with the first processing layer and take over the operation of the first processing layer when there is a failure of the first processing layer; the system safety components are configured to process a fault corresponding to the received fault information based on the information of the vehicle hot standby fault processing system.

A vehicle including the hot standby fault processing system for vehicles as above, or a vehicle implementing the hot standby fault processing method for vehicles as above is provided in the disclosure.

DETAILED DESCRIPTION OF THE EMBODIMENTS

In order to make the above objects, features and advantages of the present invention more obvious and understandable, the specific embodiments of the present invention will be described in detail with reference to the accompanying drawings. In the following description, numerous specific details are set forth in order to provide a thorough understanding of the present invention. However, the invention can be implemented in many other ways different from those described here, and those skilled in the art can make similar improvements without violating the connotation of the invention, so the invention is not limited by the specific implementation disclosed below.

Figure 1:
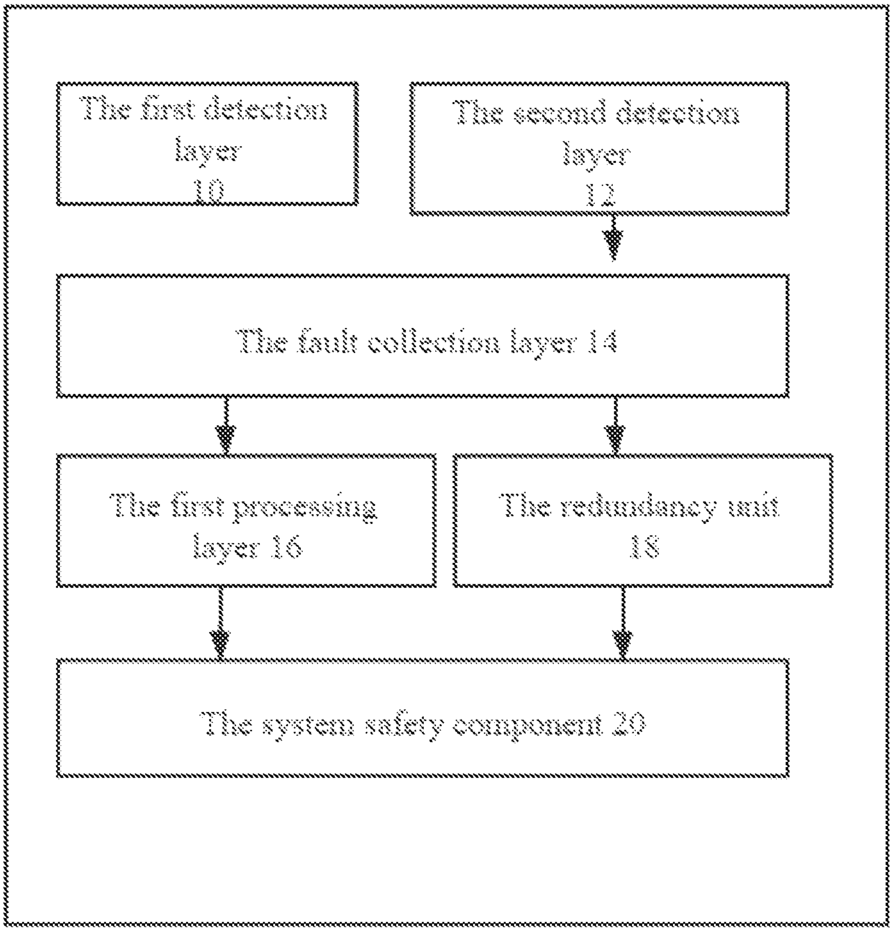
FIG. 1 is a structural schematic diagram of a hot standby fault processing system for vehicles according to an example of the present disclosure.

FIG. 1 is a structural schematic diagram of a hot standby fault processing system for vehicles according to an example of the present disclosure. As shown in the figure, the hot standby fault processing system includes a first detection layer 10, a second detection layer 12, a fault collection layer 14, a first processing layer 16, a redundancy part 18 and a system safety component 20. The first detection layer 10 is configured to detect the running state of the system with low security level and record fault information when a fault is detected. The second detection layer 12 is configured to detect the running state of a system with critical safety level and send the fault information when a fault is detected. The fault collection layer 14 is connected with the second detection layer 12 and receives the fault information sent by the second detection layer 12. The fault collection layer 14 classifies and records the received fault information, freezes the running state of the corresponding system and sends the fault information to a higher processing layer. The freezing of the running state of the corresponding system here means recording the data and related information when the fault occurs in an appropriate way for subsequent analysis, for example, keeping a snapshot of the running state of the system when the fault occurs. The first processing layer 16 receives the fault information sent by the fault collection layer 14, processes the faults corresponding to the received fault information according to a preset policy, and sends the fault information of the faults which cannot be processed to the system safety component 20. The redundancy part 18 is configured as a backup of the first processing layer 16 in parallel with the first processing layer 16 and take over the operation of the first processing layer 16 when there is a failure in the first processing layer 16. The system safety component 20 is configured to process the fault corresponding to the received fault information based on the information of the vehicle hot standby fault processing system (e.g., hardware information in the system, etc.). In all the examples in the disclosure, the abnormal running state of the system can be called a fault. In all examples of the disclosure, the term "operating state of the system" in the system refers to the application system set in the vehicle based on software, hardware or their combination, such as vehicle infotainment system, advanced auxiliary driving system (ADAS) of the vehicle, etc.

According to the disclosure, each application system based on software, hardware or a combination thereof arranged in a vehicle is provided with a vehicle hot standby fault processing system for the system. In the following, an example of setting the hot standby fault processing system for vehicles shown in FIG. 1 in the advanced assistant driving system (ADAS) will be described.

The first detection layer 10 records fault information when it detects that the operating state of the system with low security level is faulty. A system with low safety level here refers to an application system based on software, hardware or their combination which has no influence on the operation and safety of the vehicle. For example, the camera defects in the ADAS system in this example can be set as the running state of the system with low safety level. In various examples of this disclosure, the safety classification of the operating state of the system can refer to the relevant safety standards, for example, the risk classification scheme defined by ISO 26262-Road Vehicle Functional Safety Standard. The fault record of the first detection layer 10 is helpful to quickly locate the place where the abnormal operation state occurs during subsequent maintenance. However, in some examples, the records made by the first detection layer 10 can also be transmitted to, for example, the second detection layer or directly to the fault collection layer.

The second detection layer 12 detects the running state of the system with critical safety level, and sends fault information to the fault collection layer 14 when a fault is detected. The system with critical safety level refers to the application system based on software, hardware or their combination which has influence on the operation and/or safety of the vehicle. For example, the fault that front radar in the ADAS system cannot collect external information. When the second detection layer 12 detects the fault, it sends the fault information of the radar to the fault collection layer 14. The second detection layer 12 also detects the delay in the data transmission of the ADAS system, that is, sends the fault information that the data transmission of the ADAS system to the fault collection layer 14.

In this example, the fault collection layer 14 classifies and records the received fault information. The fault collection layer 14 classifies the received fault information, for example, according to the importance of faults. The fault collection layer 14 records the classified fault information for maintenance. Meanwhile, according to the example of the disclosure, the fault collection layer 14 also freezes the running state of the system corresponding to the fault information and sends the fault information to a higher processing layer. The fault collection layer 14 analyzes whether a fault is a random fluctuation of state or a true fault according to the state flag bit accumulation of each fault, for example, so as to avoid false triggering of the fault processing mechanism due to the state fluctuation of the vehicle configuration. After the failure is confirmed, the fault collection layer 14 freezes the running state of the corresponding system and sends the failure information to the higher processing layer. For example, the fault collection layer 14 receives fault information indicating that the front radar cannot collect external information, and fault information indicating that the data transmission of the ADAS system fails. The fault collection layer 14 lists the fault information indicating data transmission as the most important, for example, the highest priority, and lists the fault information that cannot collect external information as the second most important, for example, the high priority. In this way, the fault information is collected and classified by the fault collection layer 14, so that the second detection layer 12 is more focused on detecting the running state of the system without dividing the processing capacity to classify the faults. For the first processing layer 16, it only needs to process according to the marked marks indicating the importance degree, without classifying.

According to examples of the present disclosure, the fault collection layer 14 also sends fault information to the backup of the first processing layer 16, that is, the redundancy part 18. The redundancy part 18 runs in parallel with the first processing layer 16 and monitors the running state of the first processing layer 16, so as to seamlessly take over the operation of the first processing layer 16 when there is a failure in the first processing layer 16.

The first processing layer 16 is, for example, a decision processing layer in the disclosure, and processes faults according to a preset fault decision algorithm, for example, self-repairing control. In the examples of the disclosure, once the first processing layer 16 fails to process, it will report the failure information to the system security component 20. The system safety component 20 will process the fault corresponding to the received fault information based on the relevant information of the vehicle hot standby fault processing system, for example, based on the total hardware information, software information or their combination, so as to protect the vehicle hot standby fault processing system.

According to the hot standby fault processing system for vehicles as described above, the second detection module is set for the system application which is set in the vehicle with critical safety level, so that the fault information can be actively reported, the fault collection method is enriched, and the situation that any key configuration in the system runs abnormally is avoided. In addition, the faults reporting is also beneficial to the hot standby of higher-level modules such as fault collection module or first processing module in the fault processing system, realizing full coverage monitoring of the system installed in the vehicle through monitoring function and systematic process state tracking. In addition, only the first processing layer 16 or higher lever are configured with system decision-making function, fault processing function and control authority for the low level processing layer (such as fault collection layer, second detection layer, etc.), which is helpful to avoid the whole hot standby fault processing system being illegally called and maliciously changed, resulting in abnormal system control.

According to an example of the disclosure, the first processing layer 16 is provided in the first core of one processor, and the redundancy part 18 is disposed on the second core of the same processor. The first core and the second core herein are only for distinguishing these two cores arranged on the same chip, but not for other restrictions. And according to the example of this application, the operation of the first processing layer 16 and the redundancy part 18 is based on symmetric multi-processing SMP technologies. The SMP can make multiple identical processing subsystems on a single chip run the same instruction set, and make multiple identical processing subsystems on a single chip have equal access rights to memory, I/O and external interrupts. A single copy of the operating system can control all cores, so that any processor can run all threads, regardless of the distinction between cores, applications or interrupt services. According to the examples of the disclosure, the SMP can activate a specific core or multiple cores required for executing tasks, so that the ECU of the vehicles has highly scalable performance, which fully meets the most popular and potential applications in the industry nowadays. In the multi-core processor architecture, each core has its own L1 and L2 cache, while the L3 cache is shared. If a process switches back and forth between cores, the cache hit rate of each core will be affected. On the contrary, if the process can always be executed on one core no matter how it is scheduled, the hit rate of the L1 and L2 cache of its data can be significantly improved. The dual-core process redundancy control in the present disclosure (as the redundancy control between the dual-core first processor 16 and the redundancy part 18) emphasizes its division of workload control based on the redundancy control, improves the utilization rate of processors, and ensures the performance of system operation.

According to the example of the disclosure, the first processing layer 16 and the redundancy part 18, which are backup to each other, are respectively bound to run on different cores of the same processor, and are divided into a main process and a standby process which are logically independent and have the same processing results by adopting a software heterogeneous mode. The main process runs on the first processing layer 16, and the standby process runs on the redundancy part 18. The main process controls the overall decision scheme and completes the fault self-recovery control. The standby process monitors the main process, and once faults are found, the standby process takes over the operation of the main process. When there is a result dispute between the main process and the standby process, relevant data are collected and submitted to the system security component 20 for adjudication. In this way, the main process and the standby process of the first processing layer 16 and the redundancy part 18 can be seamlessly switched, and when there is a dispute, the system security component 20 as a third party will arbitrate with relevant information to ensure the correctness of the processing result.

According to examples of the present disclosure, the first processing layer 16 and the redundancy part 18 are arranged in two cores in the ARM R5 security chip. System safety component 20 is cortex-r5 processor. In this example, after detecting the abnormality of the first processing layer 16 (which runs the main process), the redundancy part 18 immediately takes over the control of the whole hot standby fault processing system, calls the data backup synchronization module to synchronize the system data into the standby process. The standby process receives the fault information and takes over the system control and R5 communication related functions, thus becoming a new safety control main process. After the original main process records the abnormal information data, it restarts as a standby process and calls the detection module to complete the detection of the new safety control process. Two backup control processes run on different cores, which can ensure the system performance and reduce the system performance impact caused by context switching.

Figure 2:
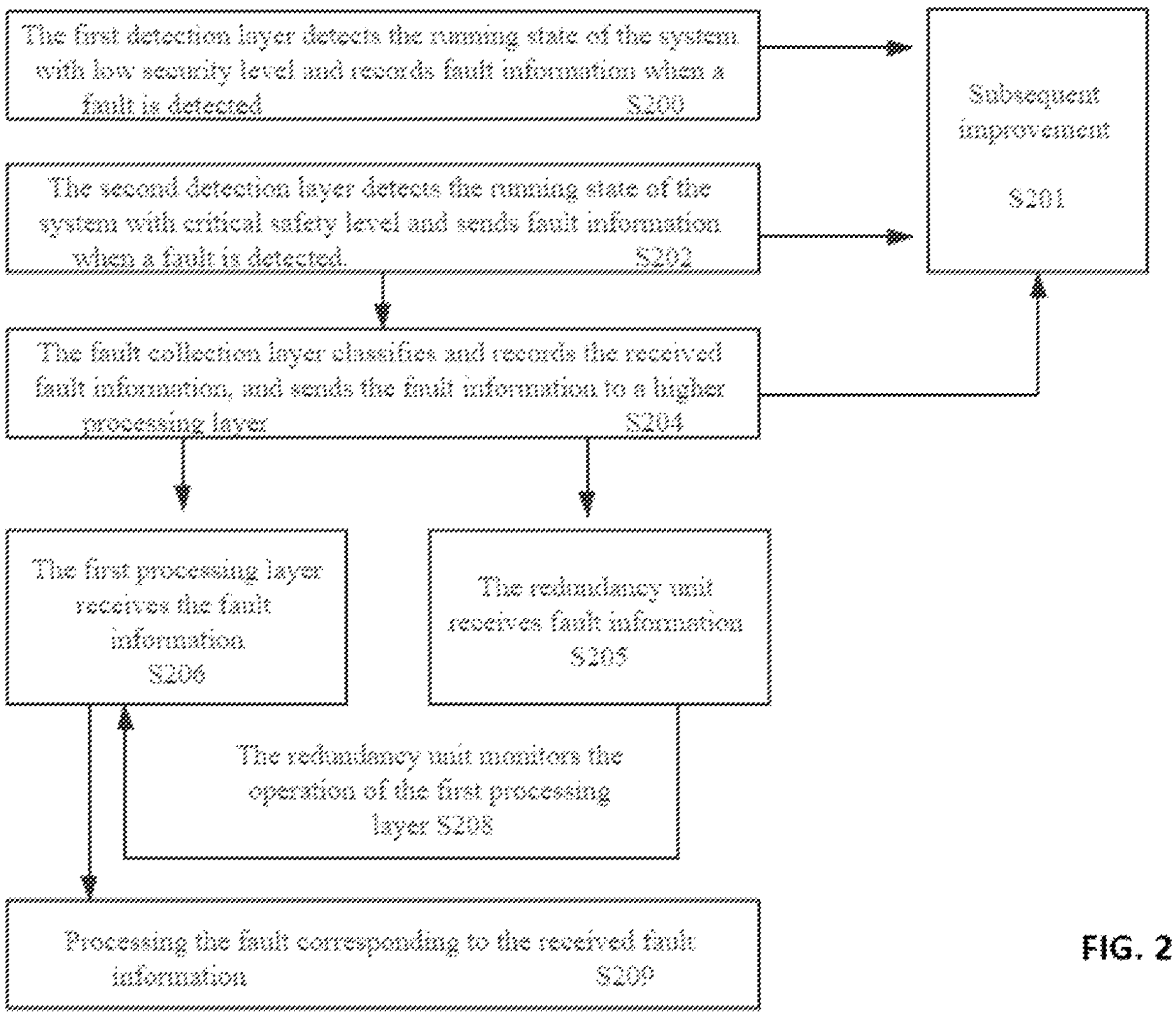
FIG. 2 is a flow chart of a vehicle hot standby fault processing method according to another embodiment of the present disclosure.

FIG. 2 is a flowchart of a method for processing a hot standby failure for a vehicle according to another embodiment of the present disclosure. By way of example, but not limitation, the method shown in FIG. 2 can be implemented in the hot standby fault processing system for vehicles shown in FIG. 1. The method shown in FIG. 2 will be described below with reference to the FIG. 1.

As shown in FIG. 2, in step S200, the first detection layer 10 detects the running state of the system with low security level and records fault information when a fault is detected. It should be noted that the fault information recorded in step S200 will at least be used for the subsequent improvement of the vehicle, that is, for maintenance or repair, as shown in step S201.

In step S202, the second detection layer 12 detects the running state of the system with critical safety level and sends fault information when a fault is detected. Optionally, the data recorded in step S202 can also be used to improve the vehicle configuration later, as shown in step S300.

In step S204, the fault collection layer 14 classifies and records the received fault information, and sends the fault information to a higher processing layer. Optionally, the data recorded in step S204 can also be used to improve the vehicle configuration later, as shown in step S300.

It should be noted that in step S205, the fault collection layer 14 also sends fault information to the redundancy unit 18. In step S206, the first processing layer 16 receives the fault information sent by the fault collection layer, processes the fault corresponding to the fault information according to the preset policy, and sends the fault information of the failure that cannot be processed to the system safety component. In step S208, the redundancy unit 18 monitors the first processing layer 16 and takes over the operation of the first processing layer 16 if there is a failure. In step S209, the system safety component 20 processes the fault corresponding to the received fault information based on the relevant information of the vehicle hot standby fault processing system. In some examples of the disclosure, when there is a result dispute between the process running in the redundancy part 18 and the process running in the first processing layer 16, relevant data are sent to the system security component 20 for adjudication.

The technical details described above in connection with FIG. 1 are also applicable to the example of the method shown in FIG. 2. For example, the first processing layer and the redundancy part are arranged on two cores of the same processor, and they are configured to run based on symmetric multiprocessing. Independent processor is set up as system safety component. Regarding the running state of the system, and the life span with low safety level and critical safety level, for the sake of brevity, descriptions will not be repeated.

Figure 3:
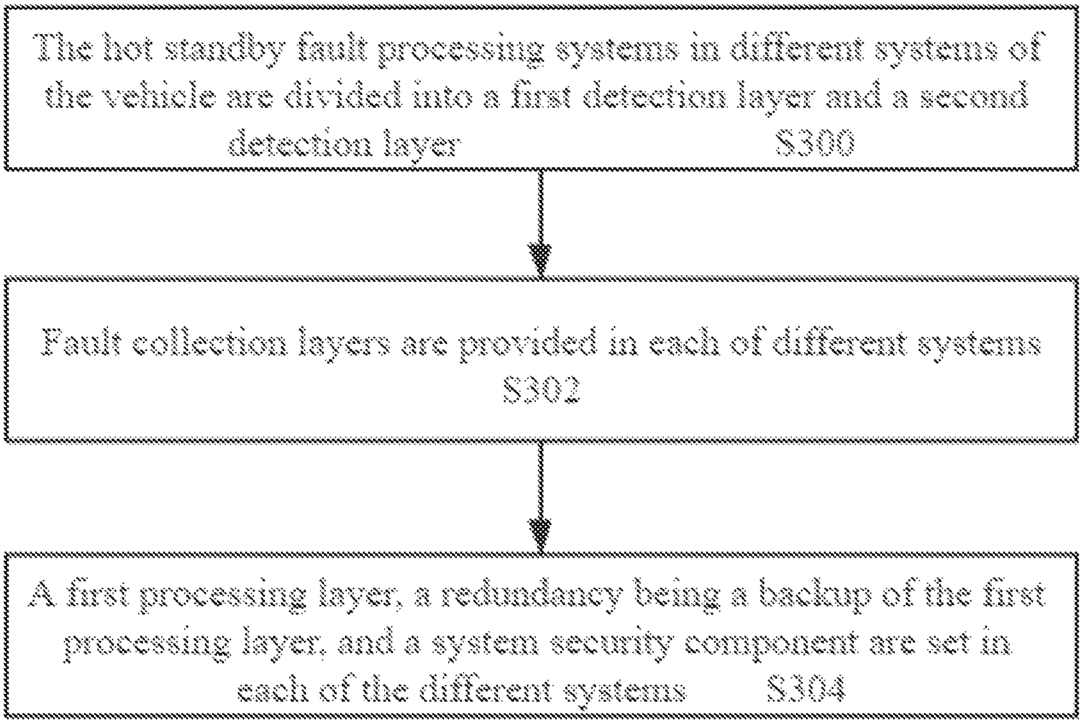
FIG. 3 is a flow chart of a vehicle hot standby fault processing method according to another embodiment of the present disclosure.

FIG. 3 is a flow chart of a vehicle hot standby failure processing method according to another embodiment of the present disclosure. As shown in the figure, in the step S300, the hot standby fault processing systems in different systems of the vehicle are divided into a first detection layer and a second detection layer. Wherein, the first detection layer is used to detect the running state of systems with low security level and record fault information when faults are detected. While the second detection layer is used to detect the running state of systems with critical security level and send fault information when faults are detected. In step S302, a fault collection layer is set in each of different systems. The fault collection layer is used to classify and record the received fault information after receiving the fault information sent by the second detection layer, freeze the running state of the system corresponding to the fault information, and send the fault information to a higher processing layer. In step S304, a first processing layer, a redundancy being a backup of the first processing layer, and a system security component are set in each of the different systems. The first processing layer is used for receiving fault information sent by the fault collection layer, processing faults corresponding to the fault information according to a preset strategy, and sending fault information of faults which cannot be processed to system safety components. The redundancy part is used for being a backup with the first processing layer mutually, and takes over the operation of the first processing layer when the first processing layer fails. The system safety component is used for processing the fault corresponding to the received fault information for the information based on the vehicle hot standby fault processing system.

The first processing layer and redundancy part can be arranged on two cores of the same processor, and they are configured to be operated in a symmetric multiprocessing mode. In addition, according to some examples, an independent processor may be provided as a system safety component.

Simply, as shown in FIG. 3, the hot standby fault processing system for vehicles described in connection with FIG. 1 can be configured in vehicles such as ADAS system and infotainment system. In the example shown in FIG. 3, the first detection layer, the second detection layer, the fault collection layer, the first processing layer, the redundancy part and the system safety components involved are the same as or similar to those described above in conjunction with FIG. 1.

According to an example of the disclosure, a vehicle is also provided. The vehicle includes the hot standby fault processing system for vehicles described in the disclosure, or the vehicle can implement the hot standby fault processing method for vehicles described in the disclosure.

In addition, it should be noted that the first detection layer, the second detection layer, the fault collection layer, the first processing layer, the redundancy part and the system safety components in the vehicle hot standby fault processing system described in the disclosure can all be set in the electronic control unit ECU of the corresponding system in the form of software, hardware or a combination of software and hardware. For example, the hot standby fault processing system for the ADAS system is set in the ECU of ADAS. The hot standby fault processing system for the infotainment system is provided in the ECU of the infotainment system. However, it is not limited to this, and the hot standby fault processing system for vehicles described herein must be implemented in the ECU.

The above-mentioned embodiments only express several embodiments of the disclosure, and their descriptions are specific and detailed, but they cannot be understood as limiting the scope of the invention disclosure. It should be noted that, for those of ordinary skill in the art, without departing from the concept of the present invention, several modifications and improvements can be made, which belong to the protection scope of the present disclosure. Therefore, the scope of protection of the patent of the present invention shall be subject to the appended claims.

What is claimed is:

1. A hot standby fault processing system for vehicles, comprising:

a first detection layer, processed in at least one processor, configured to detect a running state of a system with low security level and record fault information when a fault is detected;

a second detection layer, processed in the at least one processor, configured to detect the running state of a system with critical safety level and send the fault information when the fault is detected;

a fault collection layer, processed in the at least one processor, configured to receive the fault information sent by the second detection layer, classify and record the received fault information, freeze the running state of the system corresponding to the fault information, and send the fault information to a first processing layer;

the first processing layer, processed in ta first core of the at least on processor, configured to receive fault information sent by the fault collection layer, process faults corresponding to the fault information according to a preset policy, and send fault information of faults that cannot be processed to system safety components;

a redundancy part, processed in a second core of the at least one processor, configured as a backup with the first processing layer and to take over the operation of the first processing layer when there is a failure of the first processing layer;

wherein the system safety components, processed in the at least on processor, are configured to process a fault corresponding to the received fault information based on the information of the vehicle hot standby fault processing system.

2. The vehicle hot standby fault processing system of claim 1, wherein the first processing layer and the redundancy part are configured to be operated based on a symmetric multiprocessor.

3. The vehicle hot standby fault processing system of claim 1, wherein the system safety component is a separate processor.

4. The vehicle hot standby fault processing system of claim 1, wherein the running state of the system with low safety level is a vehicle system having no effects on the operation and safety of the vehicle; and the running state of the system with critical safety level is the vehicle system of the vehicle which affects the operation and or safety of the vehicle.

5. A vehicle comprising the hot standby fault processing system for vehicles according to claim 1.

6. A fault processing method of hot standby for vehicles, comprising:

detecting, by a first detection layer, processed in at least one processor, a running state of a system with low security level and recording fault information when a fault is detected;

detecting, by a second detection layer processed in the at least one processor, the running state of a system with critical safety level and sending the fault information when the fault is detected;

receiving, by a fault collection layer, processed in the at least one processor, the fault information sent by the second detection layer, classifying and recording the received fault information, freezing the running state of the system corresponding to the fault information, and sending the fault information to a first processing layer;

receiving, by the first processing layer, processed in a first core of the at least one processor, the fault information sent by the fault collection layer, processing faults corresponding to the fault information according to a preset policy, and sending fault information of faults that cannot be processed to system safety components;

configuring a redundancy part, processed in a second core of the at least one processor, as a backup with the first processing layer and taking over the operation of the first processing layer when there is a failure of the first processing layer;

wherein the system safety components, processed in the at least one processor, are configured to process a fault corresponding to the received fault information based on information of the vehicle hot standby fault processing system.

7. The vehicle hot standby fault processing method of claim 6, wherein the first processing layer and the redundancy part are arranged on two cores of the same processor, and they are configured to be operated in a symmetric multiprocessing mode.

8. The fault processing method of claim 6, wherein an independent processor is configured as the system safety components.

9. The fault processing method of claim 6, wherein the running state of the system with low safety level is a vehicle system whose fault does not affect the operation and safety of the vehicle; and the running state of the system with critical safety level is the vehicle system of the vehicle which affects the operation and/or safety of the vehicle.

10. A vehicle implementing the hot standby fault processing method for vehicles according to claim 6.

11. A fault processing method of hot standby for vehicles, comprising:

dividing a hot standby fault processing system arranged in different systems of the vehicle into a first detection layer and a second detection layer, processed in at least one processor; wherein the first detection layer is configured to detect a running state of a system with low security level and record fault information when a fault is detected; the second detection layer is configured to detect the running state of a system with critical safety level and send the fault information when the fault is detected;

providing a fault collection layer in each of the different systems; wherein the fault collection layer, processed in the at least one processor, is configured for receiving the fault information sent by the second detection layer, classifying and recording the received fault information, freezing the running state of the system corresponding to the fault information, and sending the fault information to a first processing layer;

providing the first processing layer, processed in a first core of the at least one processor, a redundancy part, processed in a second core of the at least one processor, mutually backed up with the first processing layer and a system safety component, processed in the at least one processor, in each of the different systems; wherein the first processing layer is configured to receive fault information sent by the fault collection layer, process faults corresponding to the fault information according to a preset policy, and send fault information of faults that cannot be processed to system safety components;

the redundancy part is configured as a backup with the first processing layer and take over the operation of the first processing layer when there is a failure of the first processing layer; the system safety components are configured to process a fault corresponding to the received fault information based on the information of the vehicle hot standby fault processing system; and wherein the first processing layer and the redundancy part are arranged on two cores of the same processor, and they are configured to be operated in a symmetrical multiprocessing mode.

12. The fault processing method of claim 11, wherein an independent processor is configured as the system safety components.

* * * * *